(12) United States Patent
Schwaiger et al.

(10) Patent No.: US 7,144,543 B2
(45) Date of Patent: Dec. 5, 2006

(54) METHOD AND DEVICE FOR PRODUCING PLASTIC PROFILES

(75) Inventors: Meinhard Schwaiger, Linz (AT); Frank Dorninger, Micheldorf (AT)

(73) Assignee: Technoplast Kunstsofftechnik GmbH, Micheldorf (AT)

( * ) Notice: Subject to any disclaimer, the term of this patent is extended or adjusted under 35 U.S.C. 154(b) by 315 days.

(21) Appl. No.: 10/363,643

(22) PCT Filed: Sep. 5, 2001

(86) PCT No.: PCT/AT01/00279

§ 371 (c)(1),
(2), (4) Date: Mar. 26, 2003

(87) PCT Pub. No.: WO02/20247

PCT Pub. Date: Mar. 14, 2002

(65) Prior Publication Data

US 2003/0170337 A1   Sep. 11, 2003

(30) Foreign Application Priority Data

Sep. 5, 2000   (AT) ............................... GM647/2000

(51) Int. Cl.
*B29C 47/88* (2006.01)
(52) U.S. Cl. ................... 264/481; 264/177.17; 425/71; 425/378.1
(58) Field of Classification Search ............. 156/309.9, 156/244.13, 244.15, 244.22, 244.25, 244.27; 425/378.1, 374, 382.3; 264/167, 177.17, 264/209.4, 248, 481
See application file for complete search history.

(56) References Cited

U.S. PATENT DOCUMENTS

| | | | | |
|---|---|---|---|---|
| 3,758,370 A | * | 9/1973 | Sakurai et al. | ............... 428/119 |
| 4,092,394 A | | 5/1978 | Dixon | |
| 4,540,537 A | * | 9/1985 | Kamp | ................... 264/173.17 |
| 4,690,862 A | | 9/1987 | Hoffmann | |
| 4,851,067 A | * | 7/1989 | Ogawa et al. | ......... 156/244.18 |
| 4,933,032 A | * | 6/1990 | Kunert | ...................... 156/108 |
| 5,265,377 A | * | 11/1993 | Iwasa et al. | ................... 49/441 |
| 5,433,808 A | * | 7/1995 | Yada et al. | ............ 156/244.15 |
| 5,447,671 A | * | 9/1995 | Kato et al. | ................... 264/148 |
| 5,500,264 A | * | 3/1996 | Yada et al. | ................ 428/36.9 |
| 6,268,031 B1 | * | 7/2001 | Bleibler | ..................... 428/36.8 |
| 6,273,983 B1 | * | 8/2001 | Miyakawa et al. | .... 156/244.13 |
| 6,368,445 B1 | * | 4/2002 | Rost et al. | ............. 156/244.25 |

FOREIGN PATENT DOCUMENTS

| | | |
|---|---|---|
| DE | 3405512 | 8/1985 |
| DE | 3640887 | 6/1988 |
| DE | 4429091 | 6/1995 |
| DE | 19625209 | 1/1998 |

(Continued)

*Primary Examiner*—Mark Eashoo
(74) *Attorney, Agent, or Firm*—Dykema Gossett PLLC

(57) ABSTRACT

The invention relates to a method for producing plastic profiles comprised of at least one hard profile strand (2), for example, consisting of hard PVC, and of at least one soft profile strand (1), for example, consisting of soft PVC, whereby both profile strands (1, 2) are simultaneously produced by separate extrusion nozzles (20, 17a) and are cooled in a cooling device (16, 18). A secure joining can be effected using simple means by leading the soft profile strand (1) directly out or the extruder (17) and into a cooling bath (16, 18), inside of which it is completely cooled, and the hard profile strand (2) and the soft profile strand (1) are subsequently joined under pressure.

15 Claims, 4 Drawing Sheets

FOREIGN PATENT DOCUMENTS

| EP | 0152123 | 8/1985 |
| EP | 0455670 | 4/1993 |
| GB | 1334565 | 10/1973 |
| WO | 8803863 | 6/1988 |

* cited by examiner

METHOD AND DEVICE FOR PRODUCING PLASTIC PROFILES

BACKGROUND OF THE INVENTION

The invention relates to a method for producing plastic profiles comprised of at least one hard profile strand, consisting of hard PVC for example, and at least one soft profile strand, consisting of soft PVC for example, with both profile strands being produced simultaneously by separate extrusion dies and being cooled in a cooling apparatus.

Such plastic profiles are used among other things in the window industry for producing plastic window frames or wings, or as other profiles. A plastic profile can consist for example of a hard profile strand as the basic body which comprises one or several sealing profiles (soft profile strands).

DESCRIPTION OF THE PRIOR ART

Known apparatuses and methods which correspond to the state of the art are:

Co-extrusion method: The joining of the hard PVC profile with the soft PVC profile occurs in the extrusion die. The disadvantageous aspect is the complex extrusion die and the fact that the unusable profiles as are obtained during the start-up of an extrusion line in larger quantities cannot be recycled due to the fact that there is no uniform material and the sealing can also not be separated from the profile. Moreover, the cooling and calibration of the profile which is provided with the sealing is difficult. Furthermore, production is very inflexible because in the case of similar basic profiles different extrusion dies are necessary when the sealing profiles are different.

Post co-extrusion method: The joining of the two profile elements occurs after the cooling of the hard PVC profile with the soft PVC profile or the like which is shaped in a separate extrusion die, with the hard PVC profile being heated locally to welding temperature at the point to be welded by external introduction of heat until a doughy consistency is achieved and with the soft PVC profile strand which emerges from a second die being extruded directly onto the same at melting temperature. Then a renewed cooling of the profile is necessary with a water bath for example. Such a method is described for example in EP 455 670 B. The control of this method is difficult because it is necessary to ensure that the extruder is directed directly onto the hard PVC profile for the sealing so as to ensure a correct joining. The additional introduction of energy into the hard PVC profile leads to internal stresses and increases the likelihood of warping of the profile, which represents an impairment to the quality. A further disadvantage is the increased need for space due to the additional cooling device.

Post co-extrusion method by extruding into a groove: The two profile elements are joined with each other in such a way that the soft PVC profile strand is extruded into a receiving groove of the cooled hard PVC profile strand and that subsequently both profile strands are cooled jointly in a cooling apparatus, e.g. a water bath. This method necessarily requires a groove because an adequate hold of the sealing is only ensured by a positive-locking connection. Such a solution is disclosed in WO 88/03863 A for example.

Mechanical joining methods by "rolling in" a soft PVC seal into the cold hard PVC profile strand. In this process the seal is unwound from a supply roll, which necessitates a respective warehousing and causes difficulties during the change of the roll. Internal stresses in the soft PVC profile strand due to extensions during the rolling in can further lead to shrinkages after the cutting to size, i.e. the sealing length is shorter than the profile length, leading to an insufficient sealing effect.

SUMMARY OF THE INVENTION

It is the object of the present invention to provide a more cost-effective alternative with a new apparatus and a new method for producing profiles with seals for example which avoid the aforementioned disadvantages.

This object is achieved in accordance wit the invention by a method in which the soft profile strand is led directly from the extruder into a cooling bath in which it is cooled off completely and wherein the hard profile strand and the soft profile strand are subsequently joined under pressure.

The relevant aspect in the invention is that the two profile strands are extruded simultaneously, but separately from each other and that each profile strand is cooled completely, so that the hard profile strand in particular remains dimensionally stable. Since thus the soft profile strand is also present in the cold state, a relatively high pressure can be applied in order to join the two profiles. Preferably, a slight supply of energy can be used to reduce internal stresses in the soft profile strand.

In a first especially preferable embodiment of the invention it is provided that the hard profile strand and/or the soft profile strand are heated locally after the cooling and are welded under pressure. As a result of the locally limited heating, a deformation of the hard profile strand is prevented and in addition the introduced heat quantity is so low that generally a cooling process after the welding is not necessary. It is especially appropriate to limit the local heating of the hard profile strand in order to prevent that the temperature exceeds a limit value at which the material is softened. Despite the pressure with which the soft profile strand is pressed onto the hard profile strand, it is thus possible to prevent that a displacement of material occurs.

In a further embodiment of the invention the soft profile strand is rolled into a groove of the hard profile strand. The joining of the two profile strands occurs primarily in a frictionally engaged or positive-locking fashion and only secondarily by adhesion. It has proven to be especially favorable when the rolling in of the soft profile strand occurs by rollers which are driven by a frictional wheel which rolls off on the hard profile strand. In this way the rolling-in process becomes completely independent from the extrusion speed of the hard profile strand from a control viewpoint, because the rollers for roiling in are driven by the same per se and not via an electric motor or the like. Such a preferred solution is only possible in connection with the method according to claim 1 because it requires a hard surface of the hard profile strand.

Shrinkages of the rolled-in seals can be preferably avoided in such a way that the soft profile strand is driven by rollers whose circumferential speed is higher than the rate of feed of the hard profile strand. An especially favorable grip of the sealing profile is thus also achieved.

The present invention further relates to an extrusion apparatus for producing plastic profiles, consisting of at least one hard profile strand, e.g. of hard PVC, for producing at least one hard profile strand and at least one soft profile strands as well as a joining device in which the hard profile strand is joined with the soft profile strand by using pressure, wherein a cooling bath for each profile strand is provided.

It is also possible to combine both variants and to weld the soft profile after or during the rolling into a groove of the hard profile strand under pressure.

BRIEF DESCRIPTION OF THE DRAWINGS

The invention is now explained in closer detail by reference to schematic drawings, wherein.

DETAILED DESCRIPTION OF THE PREFERRED EMBODIMENTS

Figure 1:
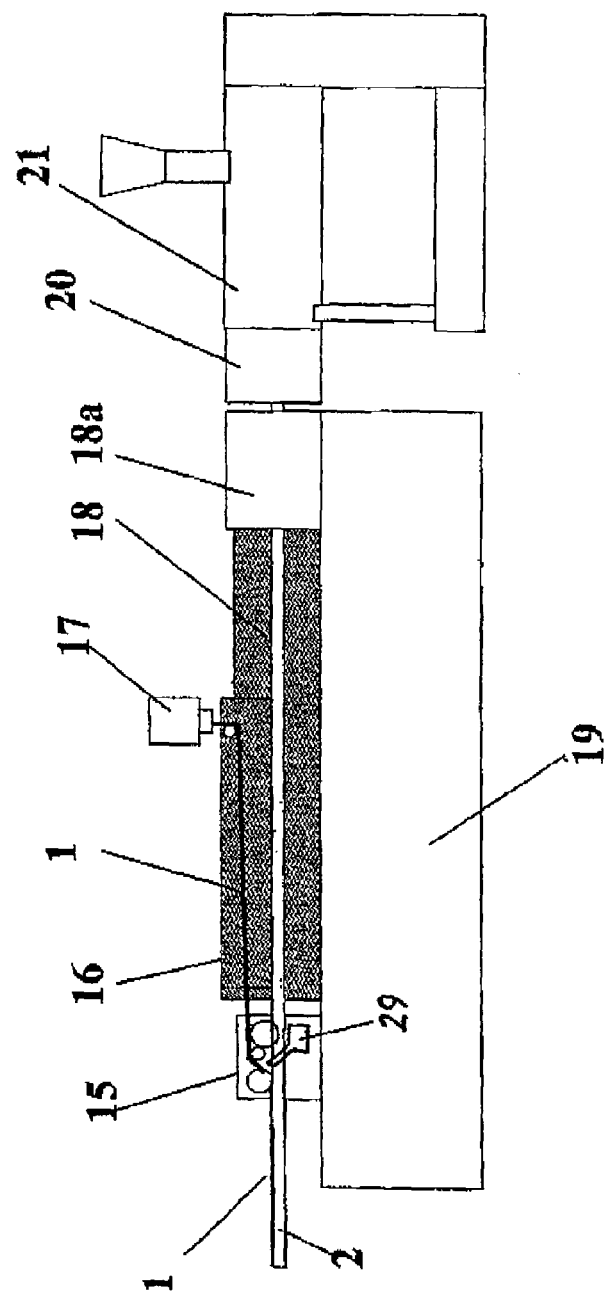
FIG. 1 shows an extrusion apparatus in accordance with the invention in a longitudinal sectional view.

The extrusion apparatus of FIG. 1 consists of an extruder 21 with an extrusion die 20 from which the hard profile strand 2 is extruded. As is generally known, the profile strand 2 is guided through one or several dry calibrating devices 18a in order to be cooled off thereafter in a cooling bath 18. Usually, such a cooling bath 18 is equipped with calibrating baffle plates.

A co-extruder 17 with an extrusion die 17a produces simultaneously a further profile strand 1, i.e. a sealing profile for example, which is cooled in a separate cooling bath 16. The two profile strands 1 and 2 are joined in a joining device 15 by using pressure in order to obtain a uniform profile. If welding is to be performed, hot air is blown from a heating device 29 onto the connection point of the profile strands. The temperature of the hot air is 180° C. for example. The heating of the two profile strands 1 and 2 is limited as a result of the hut air in such a way that no softening occurs.

Figure 2A:
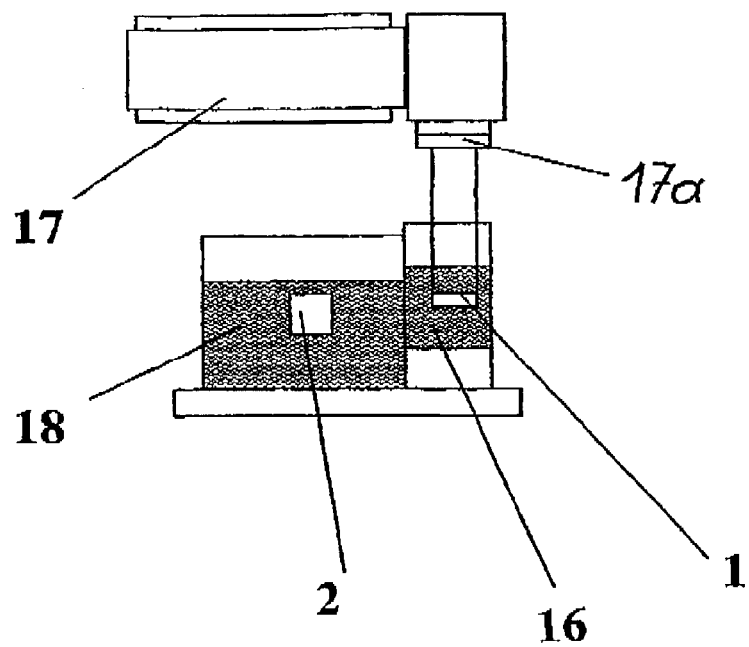
FIG. 2a shows a sectional view along line II—II in FIG. 1.

As is shown in FIG. 2a, the cooling baths 16 and 18 for the profile strands 1 and 2 are situated next to each other.

Figure 2B:
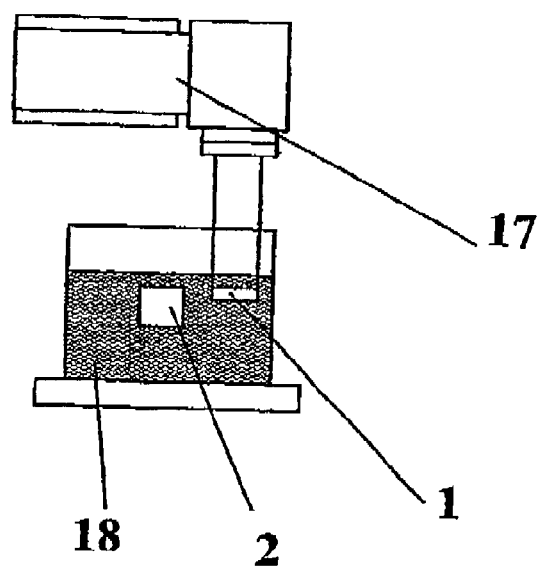
FIG. 2b shows a sectional view according to FIG. 2 in a slightly modified embodiment.

The embodiment of FIG. 2b differs from the embodiment as described above merely in the respect that the soft profile strand 1 is cooled in the same cooling bath 18 as the hard profile strand 2.

Figure 3A:
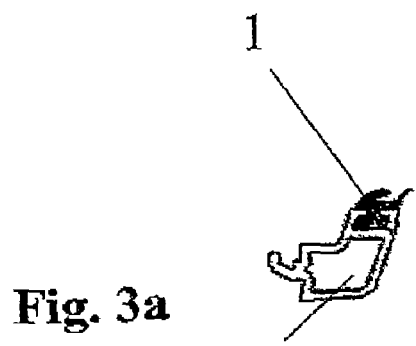
FIGS. 3a and 3b show two embodiments of plastic profiles in a cross-sectional view.
Figure 3B:
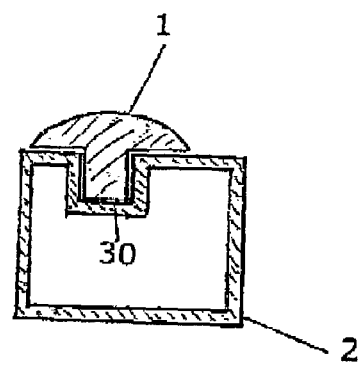

FIG. 3a shows a profile which was produced with an embodiment of the method in accordance with the invention. It can be seen that the soft profile strand 1 is pressed into an inwardly expanded groove of the hard profile strand 2 and is held in a positive-locking fashion. In the embodiment of FIG. 3b, however, the soft profile strand 1 is welded together with the hard profile strand 2 in the zone 30. The welding occurs superficially, without the soft profile strand 1 pressing into the wall of the hard profile strand 2.

Figure 4:
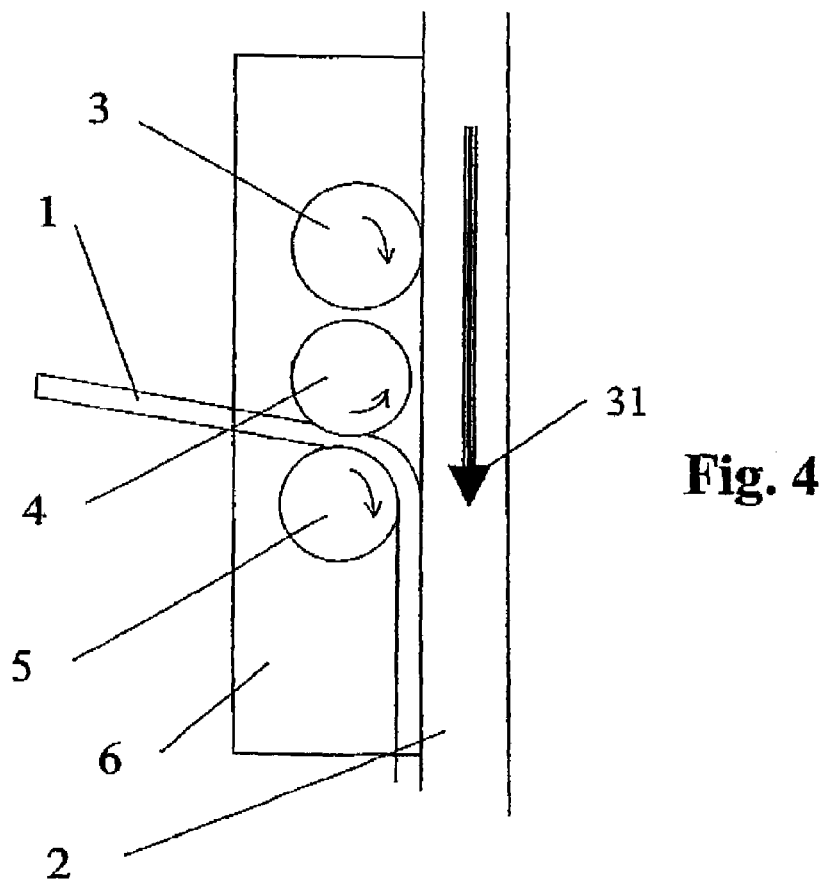
FIGS. 4, 5 and 6 show details of different embodiments of the invention, each in a top view.

FIG. 4 shows the configuration of a device in accordance with the invention for rolling the soft profile strand 1 into the hard profile strand 2. The hard profile strand 2 is moved in the direction of arrow 31 with a predetermined speed which is also called extrusion speed. The soft profile strand 1 is joined with the hard profile strand 2 by means of a rolling-in apparatus 6.

The rolling-in apparatus 6 comprises a frictional wheel 3 which rests on the hard profile strand 2 and is driven by the same. Furthermore, a press wheel 5 and a conveyor wheel 4 are provided which guide the soft profile strand 1 and press the same against the hard profile strand 2. At a diameter of 25 mm of the press wheel 5 the pressing pressure is 20 N for example.

Figure 5:
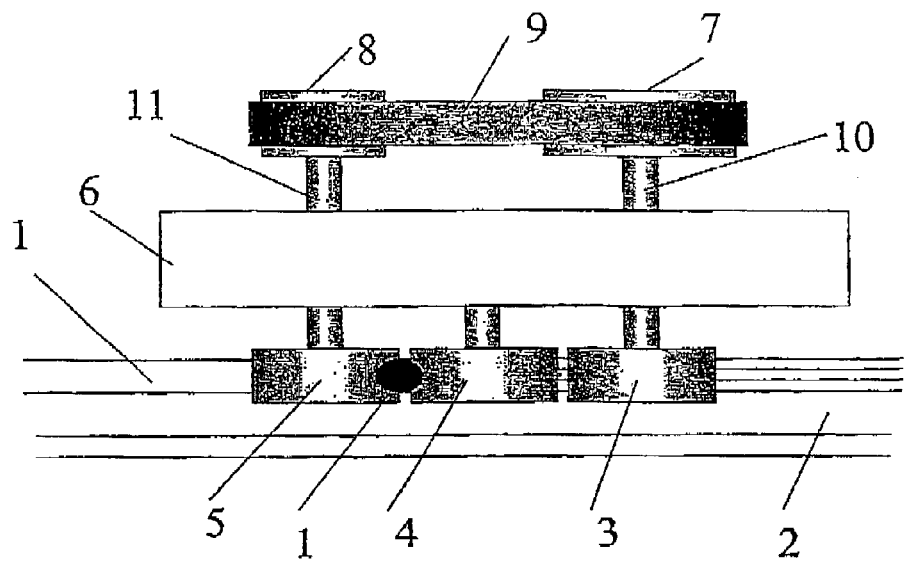

In the embodiment of FIG. 5, a first pulley 7 is connected with the frictional wheel 3 via a shaft 10. A further pulley 8 is connected via a shaft 11 with the press wheel 5 and the two pulleys 7, 8 are connected via a belt 9 which is arranged as a toothed belt for example. It is ensured in this way that the frictional wheel 3 drives the press wheel 5. By choosing the dimensions of the individual components and especially by choosing the diameter of the individual wheels 3, 7, 8 and 5 it is ensured that the circumferential speed of the press wheel 5 is approximately 5 to 10% higher than the rate of feed of the hard profile strand 2. In this way the soft profile strand 1 is compressed in the longitudinal direction during the rolling in and fills the groove under pressure which was provided for this purpose. A further positive effect of this measure is that the sealing profiles will project slightly when the profile sections are cut to miter, which is certainly a desirable effect in producing windows. The conveyor wheel 4 is not driven in the embodiment according to FIG. 5.

Figure 6:
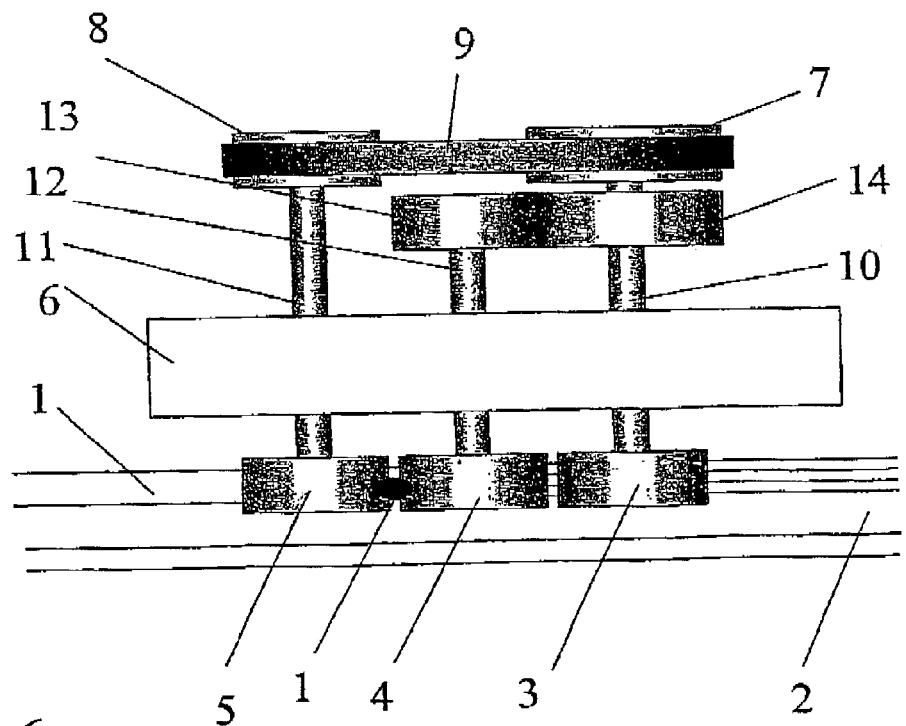

The embodiment of FIG. 6 differs from the embodiment of FIG. 5 in such a way that also the conveyor wheel 4 is driven via toothed wheels 13, 14 and a shaft 12 by the drive wheel 3. A higher pressure can be built up in this way than in the embodiment above. The conveyor wheel 4 is thus used not only for stabilizing the position, but also for driving the profile strand 1. It is obvious to the person skilled in the art that instead of drive belts or toothed wheels it is also possible to use other types of gears and that an embodiment is possible in which the conveyor wheel 4 is driven, but not the press wheel 5.

The invention claimed is:

1. A method for producing plastic profiles comprised of a hard PVC profile strand and a soft PVC profile strand comprising the steps of simultaneously forming said profile strands by separate extrusion dies, conveying said profile strands through cooling baths in which they are cooled off completely, thereafter joining the hard PVC profile strand and the soft PVC profile strand under pressure, and supplying energy to said soft PVC profile strand before and/or during the joining of the strands.

2. A method of claim 1, wherein the supply of energy occurs by means of energy from the group consisting of infrared radiation, electric radiant heater and hot air.

3. A method of claim 1, wherein heating of the hard PVC profile strand is limited in order to prevent any softening.

4. A method of claim 1, wherein the hard PVC profile strand and/or the soft PVC profile strand are locally heated after the cooling and are welded together under pressure.

5. A method of claim 1, during joining the soft PVC profile strand is rolled into a groove of the hard PVC profile strand.

6. A method of claim 5, wherein the rolling in of the soft PVC profile strand occurs by rollers or wheels which are driven by a frictional wheel which rolls off on the hard PVC profile strand.

7. A method of claim 5, wherein the soft PVC profile strand is driven by rollers or wheels whose circumferential speed is higher than the rate of feed of the hard PVC profile strand.

8. An extrusion apparatus for producing plastic profiles consisting of hard PVC and soft PVC, said apparatus comprising separate extrusion dies for producing a profile strand of hard PVC and a profile strand of soft PVC, cooling means containing a cooling bath through which said profile strands are conveyed for cooling, a joining device in which the hard PVC profile strand is joined with the soft PVC profile strand under pressure, and a heating device for heating the soft PVC profile strand between the tank of cooling bath and the joining device.

9. An extrusion apparatus for claim 8, wherein said cooling means comprises a common tank containing a cooling bath through which said strands are conveyed.

10. An extrusion apparatus of claim 8, wherein said cooling means comprises separate tanks containing cooling baths through which said profile strands are respectively conveyed.

11. An extrusion apparatus of claim 8, wherein said joining device comprises a pressing device.

12. An extrusion apparatus of claim 11, wherein the pressing device is a rolling apparatus for rolling the soft PVC profile strand into a recess of the hard PVC profile strand.

13. An extrusion apparatus of claim 12, wherein the rolling apparatus comprises a frictional wheel which is pressed onto the hard PVC profile strand and is driven by the hard PVC profile strand and the frictional wheel drives at least one roller for rolling the soft PVC profile strand into the recess of the hard PVC profile strand.

14. An extrusion of claim 12, including means for driving the rolling apparatus at a circumferential speed which is higher than rate of feed of the hard PVC profile strand.

15. An extrusion apparatus of claim 8, wherein the heating device is a hot air blower.

* * * * *